United States Patent [19]
Kampe

[11] 3,821,094
[45] June 28, 1974

[54] BRIGHT TIN ELECTRODEPOSITING ADDITIVE COMPOSITION
[75] Inventor: Marcis M. Kampe, Brookline, Mass.
[73] Assignee: Enthone, Incorporated, New Haven, Conn.
[22] Filed: May 5, 1972
[21] Appl. No.: 250,773

Related U.S. Application Data
[62] Division of Ser. No. 59,749, July 30, 1970, Pat. No. 3,694,329.

[52] U.S. Cl....... 204/54 R, 204/DIG. 2, 260/67 UA
[51] Int. Cl. .......................... C23b 5/12, C23b 5/46
[58] Field of Search.. 260/67 UA; 204/54 R, DIG. 2

[56] References Cited
UNITED STATES PATENTS

| 2,657,192 | 10/1953 | Miller et al. | 260/67 UA |
|---|---|---|---|
| 2,993,878 | 7/1961 | Marks | 260/67 UA |
| 3,258,451 | 6/1966 | Rink et al. | 260/67 UA |
| 3,313,750 | 4/1967 | Rink et al. | 260/67 UA X |
| 3,379,689 | 4/1968 | Tanaka et al. | 260/67 UA |
| 3,450,615 | 6/1969 | Eldred et al. | 260/67 UA X |
| 3,629,215 | 12/1971 | Nakaguchi et al. | 260/67 UA X |
| 3,635,898 | 1/1972 | Lorenz et al. | 260/67 UA |
| 3,637,598 | 1/1972 | Field et al. | 260/67 UA X |

*Primary Examiner*—G. L. Kaplan
*Attorney, Agent, or Firm*—Roger J. Drew; Elwood J. Schaeffer

[57] ABSTRACT

Acid tin baths for electrodepositing bright tin comprising tin ions, free acid, a non-ionic surface active agent and as a brightening agent a substantially linear, low molecular weight, soluble polymeric acrolein or methacrolein. The polymeric acrolein or methacrolein is a homopolymer or copolymer. Additive compositions for acid tin electrodepositing baths are also provided by the invention.

14 Claims, No Drawings

3,821,094

BRIGHT TIN ELECTRODEPOSITING ADDITIVE COMPOSITION

CROSS REFERENCES TO RELATED APPLICATIONS

This is a division of application Ser. No. 59,749, filed July 30, 1970, now U.S. Pat. No. 3,694,329.

BACKGROUND OF THE INVENTION

1. Field of the Invention

This invention relates to tin electrodepositing and more especially to bright acid tin electrodepositing baths and to additive compositions for use in electrodepositing bright tin from acid tin electrodepositing baths.

2. Description of the Prior Art

Acid tin electroplating baths for producing bright tin deposits are disclosed in the prior art as containing sulfate, sulfonate or fluoborate ions, a reducing agent such as formalin, a non-ionic surfactant, and as brightening agent an aromatic or heterocyclic ring-containing aldehyde wherein the carbonyl group is directly attached to the aromatic or heterocyclic ring or an $\alpha$-, $\beta$-olefinically unsaturated carbonyl compound, such as $\Delta^{1,3}$-dihydro-o-tolyladehyde, $\Delta^{1,3}$-dihydrobenzaldehyde, cinnamic acid aldehyde, $\alpha$-ethyl cinnamic acid aldehyde, 2,4-hexadienal, 3-formyl, 5,6-dihydro -2,6-dimethylpyrane, benzalacetone, benzalacetophenone, 2-benzalcyclohexanone, vinylphenylketone, p-chlorobenzalacetone, 2-cinnamylthiophene, 2-(w-acetyl)-vinylfurane, 2-(w-benzoyl)-vinylfurane, p-Cl-phenylstyrylketone, isobutylstyrylketone, w-acetyl cinnamic acid ethyl ester and p-tolylstyrylketone. The addition to acid tin electroplating baths of acrolein per se resulted in no brightness being imparted to the tin electrodeposits. Further the strong lachrymatory and irritating properties of acrolein as well as the toxic nature of this compound makes it difficult to work with.

Acid tin electroplating baths producing bright tin deposits are also disclosed in the prior art as containing sulfate, sulfonate or fluoborate ions, a non-ionic surface active agent, as primary brightener an olefinically unsaturated organic carbonyl compound selected from those disclosed immediately supra, and as secondary brightener a polymerizable organic compound capable of reducing the overvoltage for the evolution of hydrogen at a tin cathode such as acrylic acid, methacrylic acid, acrylicamide, methyacrylicamide, glycidylacrylate, propylene glycolacrylate, dimethylaminoethylmethacrylate, glyoxal, glutaric dialdehyde, $\alpha$-hydroxyadipicaldehyde, N-vinylpyrolidone, p-diethylaminobenzaldehyde, N-vinylcarbazole, 2-vinylpyridine, tetrahydrofuran, vinyl acetate, and alkylglycidyl ether.

Acid bright tin electroplating baths are also known in the prior art which contain a primary brightener of the formula X—CH=CH—Y wherein X is phenyl, furfuryl or pyridyl and Y is hydrogen, formyl, carboxyl, alkyl, hydroxyalkyl, formylalkyl, or the acyl radical of a carboxylic acid. Formaldehyde and certain imidazoline derivatives serve as secondary brighteners in such baths, especially when employed with non-ionic wetting agents.

BRIEF SUMMARY OF THE INVENTION

In accordance with the present invention, bright tin electrodeposits are obtained by utilizing as a brightening agent in otherwise conventional aqueous acid tin baths a substantially linear, low molecular weight, soluble polymeric acrolein or methacrolein. The polymeric acrolein or methacrolein can be a homopolymer or copolymer. The bath also comprises tin ions, free acid and a non-ionic surface active agent.

The homo- and copolymers of acrolein or methacrolein herein are usually of molecular weight in the range of about 300–900. The exact structure of the polymers herein is not known. In theory the homopolymers contain recurring aldehyde-containing units of the formula

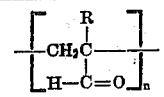

wherein $n$ is the number of such units and R is hydrogen or methyl.

The polymers of this invention are obtained by polymerizing the acrolein or methacrolein monomer in the case of homopolymers, or the acrolein or methacrolein together with the other copolymerizable reactant or reactants or comonomers in the case of the copolymers, at a polymerization temperature in an aqueous alkaline liquid medium, preferably a dilute aqueous solution of a weak base, for example an alkali metal carbonate, e.g. sodium carbonate, potassium carbonate or potassium bicarbonate. Aqueous solutions of other alkaline materials such as, for example, sodium hydroxide, potassium hydroxide or triethylamine can be utilized for the polymerization in place of the aqueous sodium carbonate, potassium carbonate or potassium bicarbonate solution. The polymerization is commenced at normal or room temperature and, if necessary, cooling of the reaction mixture is effected during the polymerization. A substantially linear, low molecular weight, soluble polymer is obtained which theoretically, in the case of acrolein and methacrolein homopolymers, has the formula:

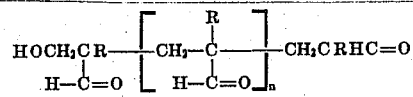

wherein $n$ is the number of repeating units and R is hydrogen or methyl. Actually the number of aldehyde groups in such polymer molecule is low, and is believed to be only about 15% to 20% of theory. The low aldehyde content of the polymers is believed due to the conversion of such groups to ether, hydroxyl or ester linkages and, at times, to aldol.

The polymers of this invention whether homopolymers or copolymers are soluble in common organic solvents, for example 1-3 C alkyl alcohols, methyl ethyl ketone, and acetone and also in dimethyl formamide.

More specifically, in the preparation of the polyacrolein homopolymer, water is introduced into a reaction vessel and acrolein added to the water therein while stirring the mixture employing magnetic stirring to keep the ingredients in motion. The acrolein is added slowly to the water. The alkaline material, e.g. the weak base such as, for instance sodium carbonate or potassium carbonate is then added to the mixture in the reaction vessel with continued stirring of the mixture. A primary amine, for example a primary aromatic amine, e.g. o-, m- or p-toluidine or aniline, is preferably then added to the mixture in the reactor with stirring of the mixture being continued. The reaction mixture is cooled in the reactor to remove exothermic heat of reaction by any suitable indirect cooling means, for instance a water jacket. The reaction mixture is contained in the reactor for a period sufficient to allow the polyacrolein to form, typically about a two hour period. The polyacrolein is then separated from the aqueous phase, for instance by decanting, and the polyacrolein then usually washed with water. The polyacrolein is then usually dissolved in a water-miscible organic liquid solvent, for example isopropanol. Alternatively the alkaline material such as the weak base, e.g. sodium carbonate or potassium carbonate can be added to the aqueous liquid, and then the acrolein and primary amine added slowly and separately to the liquid mixture from a dropping funnel. The remainder of the preparation procedure in this alternative embodiment is that disclosed immediately above.

The polymethacrolein homopolymer may be prepared by the procedure disclosed immediately supra for the acrolein homopolymer.

In the preparation of the polymeric acrolein, good ventilation, a spark-proof environment and no open flames are recommended at least during the initial stage of the reaction. Similar safety conditions are also recommended for the preparation of polymeric mathacrolein. In the case of the polymeric acrolein, it is also recommended the reactor be blanketed with nitrogen and that a closed reaction system be employed.

In the preparation of the copolymers of acrolein with the different copolymerizable compound or compounds disclosed elsewhere herein, the preparation procedure employed is very similar to that disclosed supra and the acrolein and the other copolymerizable compound or compounds can be added to the water together as a premix or added separately to the water. In the preparation of the copolymers of methacrolein with the different copolymerizable compound or compounds disclosed elsewhere herein, the preparation procedure is very similar to that disclosed supra and the mathacrolein and the other copolymerizable reactant or reactants can be added to the water together as a premix or added separately to the reaction vessel.

The acrolein and methacrolein can be represented generically herein by the formula

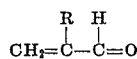

wherein R is a hydrogen atom or methyl radical.

The non-ionic surface active agent herein also imparts brightening to the tin electrodeposit as well as functioning as a wetting agent to impart wettability to the polymer. By reason of imparting brightening to the tin electro-deposit, the non-ionic surface active agent may be considered a secondary brightener in this invention. If the non-ionic surface active agent is considered a secondary brightener, then the polymeric acrolein or methacrolein is considered to be and designated a primary brightener herein. However if the non-ionic surfactant is not considered a secondary brightener herein, then the polymeric acrolein or methacrolein is designated simply a brightening agent.

Additional additives that can be added to the tin electrodepositing of this invention are, for example, polyvinylpyrrolidone as a molecular complexer, and additional isopropanol to aid solubility of the polymeric acrolein or methacrolein. An aromatic primary amine, e.g. o-, m- or p-toluidine or aniline, can also be added to the tin electrodepositing bath containing the Schiff base-terminated homopolymer or copolymer in accordance with the preferred embodiments of the invention hereinafter disclosed and also containing the non-ionic surface active agent, inasmuch as it was found that the separate addition of such aromatic primary amine to the electrodepositing bath resulted in an appreciably brighter tin electrodeposit over that obtained from the combination of the preferred Schiff base-terminated homopolymer or copolymer and the non-ionic surface active agent.

The amounts of polymeric acrolein or methacrolein and of the non-ionic surface active agent added to the tin electro-depositing bath is an amount of each of the polymer and non-ionic surface active agent which is sufficient to provide a bright tin electrodeposit. The polymeric acrolein or methacrolein and non-ionic surfactant are utilizable in the plating baths in amounts that can be varied considerably. Actually only a small or minor amount of each will suffice in the bath, with about 2–30 ml. of a polymeric acrolein or methacrolein solution of about 10% by weight polymer concentration per liter of bath solution and 2–30 ml. of non-ionic surface active agent per liter of bath solution giving satisfactory results. Greater amounts of the polymeric acrolein or methacrolein can be added to the bath with the upper limit being determined by factors of economy and solubility of the homo- or copolymer in the bath, and even somewhat smaller amounts of the polymer can be added to the bath. Greater amounts of the non-ionic surfactant can also be utilized in the bath and somewhat smaller amounts of this surfactant can also be utilized therein.

The temperature of the tin electrodepositing baths herein during the electroplating is usually in the range of about 65°–85°F.

The electroplating baths of this invention provide bright smooth tin deposits over a fairly wide range of current densities, which may range from low through high current densities, inclusive.

In carrying out the tin electrodeposition, the article or articles on which the tin is to be deposited is made the cathode in the electrodepositing bath of this invention and a direct electrical current passed from the anode or anodes through the bath to the cathode.

Any suitable non-ionic surface active agent or surfactant is utilizable herein. The surface active agents are exemplified by Triton N-101, a nonyl phenol polyether alcohol; Triton X-100, an octyl phenol polyether alcohol and other alkyl aryl polyether alcohols disclosed in the publication "Rohm & Haas Surfactants, Handbook of Physical Properties", published by Rohm & Haas Co., Independence Mall West, Philadelphia, Pa. 19105. Additional examples of non-ionic surface active agents utilizable herein are Igepal Co-710, Igepal CO-730, Igepal CO-630 and Igepal CO-430, obtainable from the Antara Chemical Company.

The brightener additives of this invention comprise a mixture of the substantially linear, low molecular weight, soluble polymeric acrolein or methacrolein, and a water-miscible diluent or carrier therefor. The diluent or carrier is usually a water-miscible organic liquid solvent such as, for example, a 1-3C alkyl alcohol, methyl ethyl ketone, acetone, dimethyl formamide, ethylene glycol or glycerine, with the polymeric acrolein or methacrolein dissolved in the solvent whereby the additive composition is a solution. The polymer can be a homopolymer or copolymer as is previously disclosed herein.

The amount of polymeric acrolein or methacrolein in the brightener additives herein can be varied over a broad range. Thus the polymeric acrolein or methacrolein (homopolymer or copolymer) can be present in the brightener additive in an amount in the range of about 5%–95% by weight based on total additive composition. The non-ionic surface active agent may also be a constituent of the brightener additive of this invention and when utilized therein, will usually be present in amount within the range of about 10%–50% by weight based on total additive composition.

Alternatively the polymeric acrolein or methacrolein can be added as such the acid tin electrodepositing bath but this is not preferred.

The polymeric acrolein or methacrolein of this invention is of low or limited solubility in the aqueous tin electroplating baths herein but is sufficiently soluble in the baths to be effective therein as a brightener.

Copolymers of acrolein or methacrolein and a different copolymerizable compound or compounds utilizable as brightening agent in the tin plating baths herein are, for example copolymers of acrolein and methacrolein, copolymers of acrolein or methacrolein and crotonaldehyde, copolymers of acrolein or methacrolein and formaldehyde, copolymers of acrolein or methacrolein and acrylamide, copolymers of acrolein or methacrolein and vinyl acetate and copolymers of acrolein, methacrolein and urea. The copolymers are preparable by the same polymerization process previously disclosed herein for preparing the homopolymers herein and involving copolymerizing the comonomers or polymerizable materials in a dilute aqueous alkaline solution as exemplified by a dilute aqueous solution of potassium carbonate, sodium carbonate or potassium bicarbonate. The acrolein-methacrolein copolymers are prepared by copolymerizing the acrolein and methacrolein in a mole ratio of typically about 4:1 respectively; the acrolein-crotonaldehyde copolymers are prepared by copolymerizing the acrolein and crotonaldehyde in a mole ratio usually in the molar ratio range of about 1–4:1 respectively; the acrolein-formaldehyde copolymers by copolymerizing the acrolein and formaldehyde in a mole ratio usually in the molar ratio range of about 4:1 to about 3:2 respectively; the acrolein-acrylamide copolymers by copolymerizing the acrolein and acrylamide in a mole ratio usually in the molar ratio range of about 4.9:0.1 to about 4:1 respectively; the acrolein-vinyl acetate copolymers by copolymerizing the acrolein and vinyl acetate in a mole ratio usually in the molar ratio range of about 4.9:0.1 to about 4:1 respectively, and the acrolein-methacrolein-urea copolymers by copolymerizing the acrolein, methacrolein and urea in a mole ratio of typically about 4.0:0.8:0.2 respectively. The copolymers of methacrolein and the different copolymerizable compound are prepared by copolymerizing the methacrolein and the different copolymerizable compound typically in the mole ratios disclosed immediately supra for the acrolein copolymer preparation with the methacrolein replacing the acrolein, except that in the case of the methacrolein-acrolein copolymers, the methacrolein and acrolein will be copolymerized typically in a mole ratio of 4:1 respectively. The exact structure of the copolymers herein is not known.

The tin or stannous ions are usually supplied in the plating baths herein as a water-soluble stannous salt, for example stannous sulfate or stannous fluoborate. The free acid of the baths are exemplified by sulfuric, fluoboric or aromatic sulfonic acid, e.g. benzene sulfonic acid. The tin and free acid concentrations of the baths can be varied over fairly broad limits as is well known in the art, with a tin content of 15–100 grams per liter (calculated as Sn), and a free acid concentration of 35-200 grams per liter being typical of the sulfate, fluoborate and aromatic sulfonate baths.

DESCRIPTION OF THE PREFERRED EMBODIMENTS

The polymers utilized as brighteners in this invention including the homopolymers and copolymers are preferably Schiff base terminated to prevent crosslinking of the polymer to form an insoluble, three-dimensional resin which is unsatisfactory for use in the tin electrodepositing bath, and also to stabilize the polymer to prevent degradation and decomposition of the polymer. Additionally the Schiff base terminal group or groups appear to have another function in the tin electrodepositing baths besides their polymer stabilization function and that is to impart brightness to the tin electrodeposit. The Schiff base terminal group or groups of the polymers are obtained by adding a primary amine as a Schiff base terminal group precursor to the polymerization (homopolymerization or copolymerization) reaction mixture, with the resulting condensation reaction between the amine hydrogens and the carbonyl group or groups' oxygen atom or atoms of the polymeric acrolein or methacrolein resulting in the Schiff base terminal group or groups. The Schiff base terminal group has the formula

wherein R is the remainder of the residue of a primary amine as is hereinafter defined and can be, for example, an aryl, heterocyclic or aralkyl radical. Any suitable primary amine can be reacted with the aldehyde carbonyl group or groups' oxygens in the polymerization reaction mixture to form the Schiff base terminal group or groups. When R is the above Schiff base terminal group formula is aryl, exemplary of such aryl radical is phenyl, tolyl, xylyl and napththyl; when R is a heterocyclic radical, exemplary of the heterocyclic radical is pyridyl; and when R is an aralkyl radical, i.e. an aromatic alkyl radical, exemplary of the aralkyl radical is benzyl.

The term "remainder of the residue of a primary amine" used herein means the remaining portion of the primary amine exclusive of the nitrogen atom and amino group hydrogens after the amino group hydrogens of the primary amine have reacted with the carbonyl group oxygen of the polymeric acrolein or methacrolein by a condensation reaction to form the Schiff base terminal group or groups. Such remaining portion of the primary amine is, for example, an aryl, heterocyclic or aralkyl radical as disclosed supra.

Any suitable primary amine is utilizable herein as reactant for forming the Schiff base terminal group or groups. Exemplary of the primary amine are mono- and bicyclic aromatic primary amines, e.g. o-, m- and p-toluidines, aniline, xylidines, e.g. 2,3-diamethylaniline, 2,4-dimethylaniline, 2,5-dimethylaniline, 3,4-dimethylaniline and 3,5-dimethylaniline, and α-napththyl amine, heterocyclic primary amines, e.g. aminopyridines, e.g. 2-aminopyridine and 3-aminopyridine, and aralkyl amines, e.g. benzyl amine. The primary amine utilized should of course be one that is capable of stabilizing the polymer or copolymer by the Schiff base terminal group or groups formation to prevent crosslinking and decomposition, which all of the above-disclosed primary amines are capable of doing.

Preferably the Schiff base terminal group or groups of the polymeric acrolein or methacrolein are formed by the condensation reaction of an aromatic primary amine, more preferably aniline or o-, m- or p-toluidine, with the carbonyl group or groups. The Schiff base terminal group or groups have the following formula when the aniline or o-, m- or p-toluidine is employed as Schiff base precursor:

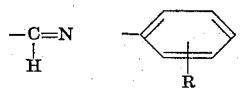

wherein R is —CH₃ or —H. o-Toluidine is preferred among the toluidines.

Preferably the primary amine precursor of the Schiff base terminal group or groups is added to the polymerization reaction mixture in the preparation of the polymer in a mole ratio of the primary amine to the α-, β-ethylenically unsaturated aldehyde, which is the acrolein or mathacrolein in the case of the homopolymers or the total of acrolein or mathacrolein plus the different copolymerizable ethylenically unsaturated aldehyde such as, for instance, methacrolein or acrolein respectively or crotonaldehyde in the case of the copolymers when such different α-, β-ethylenically unsaturated aldehyde is the copolymerizable reactant, in the molar ratio range of about 1:2.5 to about 1:7.5 respectively, more preferably about 1:4 to about 1:6 respectively. In the case of copolymers when the different copolymerizable reactant other than the acrolein or methacrolein utilized in the copolymer preparation is not an α-, β-ethylenically unsaturated aldehyde, such mole ratio in the molar ratio range of about 1:2.5 to about 1:7.5, more preferably about 1:4 to about 1:6, is of the primary amine to only the acrolein or methacrolein respectively.

When acrolein is the predominant comonomer in amount, the polymerization reaction is usually very fast and for this reason the polymerization time is preferably in the range from about 20–120 minutes so as to avoid obtaining a polymer which is difficult to dissolve in an organic solvent, e.g. isopropanol, and which tends to be produced at longer polymerization or reaction times.

The polymers of this invention are preferably dissolved in a suitably organic liquid solvent, e.g. isopropanol, as soon as possible after the polymerization is considered completed and substantially immediately after the polymer has been separated from the aqueous liquid of the reaction mixture.

The tin plating baths are preferably sulfate baths wherein the free acid is sulfuric acid and the tin or stannous ions is supplied by stannous sulfate.

The following tests were carried out to evaluate homo- and copolymers of this invention as brightener additives in acid tin electroplating.

TEST RUN NO. 1

Part A

To 50 ml. of water at room temperature in a reaction vessel 37.5 grams of acrolein (0.67 mole) was added. To this mixture was added 6 grams of sodium carbonate and also 13.8 grams of o-toluidine (0.13 mole) as precursor for Schiff base termination of the ultimate polymeric acrolein. The reaction mixture was stirred for 20 minutes. The Schiff base-terminated, substantially linear, low homopolymer of acrolein obtained, which precipitated from the liquid as a yellow resinous solid, was separated by decanting, washed with water, and dissolved in 300 ml. of isopropanol.

Part B 3 ml. of this isopropanol solution of such Schiff base-terminated, homopolymer of acrolein was added to an aqueous sulfate acid electroplating bath of the following composition:

| | |
|---|---|
| Stannous sulfate | 30 g./l. |
| Sulfuric acid | 100 ml./l. |
| Formaldehyde (37%) aqueous solution | 7 ml./l. |

The sulfuric acid of such bath was of 98% sulfuric acid concentration. 2 ml. of an ethoxylated nonyl phenol surfactant was also added to the aqueous sulfate acid tin electroplating bath. Tin plating was carried out in a Hull test cell under the following conditions: operating current of 1 and 3 amps, room temperature of the bath, and a plating time of 5 minutes. The tin electrodeposit on the Hull test panel showed good brightness over the current density range of 10–80 a.s.f.

TEST RUN NO. 2

Part A

A Schiff base-terminated, substantially linear, low homopolymer of acrolein was prepared following a substantially identical preparation procedure and utilizing the same materials and reactants and quantities thereof and reaction conditions employed in Test Run No. 1, Part A herein, except that 12 grams of aniline (0.13 mole) was utilized in this Test Run No. 2 instead of the specified amount of o-toluidine utilized in Test Run No. 1, Part A herein, as Schiff base precursor for termination of the polymeric acrolein. The Schiff base-terminated, substantially linear, low homopolymer of acrolein obtained was dissolved in 300 ml. of isopropanol.

PART B 3 ml. of such isopropanol solution of the Schiff base-terminated homopolymer is acrolein was added to a sulfate acid tin electroplating bath of substantially identical composition as utilized in Test Run No. 1, Part B herein. 2 ml. of an ethoxylated nonyl phenol surfactant was also added to the sulfate acid tin bath. Tin plating was carried out in a Hull test cell under substantially identical conditions of operating current amperage, bath temperature and plating time as employed in Test Run No. 1, Part B herein. The tin electrodeposit on the Hull test panel showed good brightness over the current density range of 10–80 a.s.f.

TEST RUN NO. 3

Part A

Acrolein in amount of 23.5 grams (0.42 mole) and 23.5 grams of crotonaldehyde (0.33 mole) were dispersed in 150 ml. of water at room temperature in a reaction vessel. The mixture was agitated vigorously and 13.8 grams of o-toluidine (0.13 mole) as Schiff base precursor for termination of the ultimate acrolein-crotonaldehyde copolymer and 6 grams of sodium carbonate were added thereto. After 20 minutes, a Schiff base-terminated, substantially linear, low copolymer of acrolein and crotonaldehyde precipitated from the liquid as a brown resinous solid which was separated by decanting, washed with water, and dissolved in 300 ml. of isopropanol.

Part B 3 ml. of this isopropanol solution of Schiff base-terminated copolymer of acrolein and crotonaldehyde was added to a sulfate acid tin electroplating bath of substantially identical composition as utilized in Test Run No. 1, Part B herein. 2ml. of an ethoxylated nonyl phenol surfactant was also added to the sulfate acid tin bath. Tin plating was carried out in a Hull test cell under substantially identical conditions of operating current amperage, bath temperature and plating time as employed in Test Run No. 1, Part B herein. The tin electrodeposit on the Hull test panel showed good brightness over the current density range of 10–70 a.s.f.

TEST RUN NO. 4

Part A

To 250 ml. of water at room temperature in a reaction vessel was added 37.5 grams of acrolein (0.67 mole) and 10 grams of aqueous formaldehyde (37%). With stirring of the liquid mixture, 4 grams of sodium carbonate and 13.8 grams of o-toluidine (0.13 mole) as precursor for Schiff base termination of the ultimate acrolein-formaldehyde copolymer were added thereto. After 20 minutes, a Schiff base-terminated, substantially linear, low copolymer of acrolein and formaldehyde was obtained, which copolymer was a pale yellow resinous semi-solid. The copolymer was dissolved in 300 ml. of isopropanol.

Part B 3 ml. of the isopropanol solution of such Schiff base-terminated copolymer was added to a sulfate acid tin electroplating bath of substantially identical composition as utilized in Test Run No. 1, Part B herein.

2 ml. of an ethoxylated nonyl phenol surfactant was also added to the sulfate acid tin bath. Tin plating was carried out in a Hull test cell under substantially identical conditions of operating current amperage, bath temperature and plating time as employed in Test Run No. 1, Part B herein. The tin electrodeposit on the Hull test panel was of good brightness over the current density range of 10–80 a.s.f.

TEST RUN NO. 5.

Part A

To 100 ml. of water at room temperature in a reaction vessel was added 40 grams of methacrolein (90%) (0.42 mole). The resulting mixture was stirred vigorously and 1 gram of sodium hydroxide and 13.8 grams of o-toluidine (0.13 mole) as precursor for Schiff base termination of the ultimate polymeric methacrolein were added thereto. After 20 minutes a Schiff base-terminated, substantially linear, low homopolymer of methacrolein precipitated from the liquid as a pale yellow resinous semi-solid which was separated by decanting, washed with water, and dissolved in 150 ml. of isopropanol.

Part B 3 ml. of the isopropanol solution of such Schiff base-terminated homopolymer was added to a sulfate tin electroplating bath of substantially identical composition as utilized in Test Run No. 1, Part B herein. 2 ml. of an ethoxylated nonyl phenol surfactant was also added to the sulfate acid tin bath. Tin plating was carried out in a Hull test cell under substantially identical conditions of operating current amperage, bath temperature and plating time as employed in Test Run No. 1, Part B herein. The tin electrodeposit on the Hull test panel showed fair brightness over the current density range of 10–70 a.s.f.

TEST RUN NO. 6

Part A

To 100 ml. of water at room temperature in a reaction vessel was added 30 grams of acrolein (0.53 mole) and 7.5 grams of methacrolein (0.09 mole). 4 grams of sodium carbonate and 13.8 grams of o-toluidine (0.13 mole) as precursor for Schiff base termination of the ultimate acrolein-methacrolein copolymer were added to the resulting mixture. After mixing the thus-obtained mixture for 20 minutes, A Schiff base-terminated, substantially linear, low copolymer of acrolein and methacrolein precipitated from the liquid as a yellow resinous semi-solid which was separated by decanting, washed with water, and dissolved in 150 ml. of isopropanol.

Part B 3 ml. of the isopropanol solution of such Schiff base-terminated copolymer was added to a sulfate acid tin electroplating bath of substantially identical composition as utilized in Test Run No. 1, Part B herein. 2 ml. of an ethoxylated nonyl phenol surfactant was also added to the sulfate acid tin bath. Tin plating was carried out in a Hull test cell under substantially identical condition of operating current amperage, bath temperature and plating time as employed in Test Run No. 1, Part B herein. The tin electrodeposit on the Hull test panel was of good brightness over the current density range of 10–60 a.s.f.

TEST RUN NO. 7

Part A

A Schiff base-terminated, substantially, low copolymer of acrolein, methacrolein and urea was prepared by a preparation procedure substantially identical to that employed in Test Run No. 6, Part A herein and utilizing the same materials and reactants and quantities thereof and reaction conditions as utilized in Test Run No. 6, Part A, except that 7.5 grams of urea as additional reactant or comonomer was added to the dispersed acrolein-methacrolein aqueous mixture prior to the addition of the sodium carbonate and o-toluidine. The Schiff base terminated, substantially linear, low copolymer of acrolein, methacrolein and urea obtained, which was a yellow, resinous semi-solid, was dissolved in 150 ml. of isopropanol.

Part B 3 ml. of the isopropanol solution of such acrolein-methacrolein-urea copolymer was added to a sulfate acid tin electroplating bath of substantially identical composition as utilized in Test Run No. 1, Part B herein. 2 ml. of an ethoxylated nonyl phenol surfactant was also added to the sulfate acid tin bath. Tin plating was carried out in a Hull test cell under substantially identical conditions of operating current amperage, bath temperature and plating time as employed in Test Run No. 1, Part B herein. The tin electrodeposit on the Hull test panel was of good brightness over the current density range of 10–50 a.s.f.

TEST RUN NO. 8

2 ml. of the isopropanol solution of Schiff base-terminated, substantially linear, low homopolymer of acrolein, prepared in accordance with Test Run No. 1, Part A herein, was added to an aqueous fluoborate acid tin electroplating bath of the following composition:

| | |
|---|---|
| Stannous fluoborate | 50 g/l |
| Fluoboric acid (48%) | 100 g/l |
| Formaldehyde (37%) aqueous solution) | 10 g/l |

0.5 ml. of an ethoxylated nonyl phenol surfactant was also added to the fluoborate acid tin bath. Tin plating was carried out in a Hull test cell under the following conditions: operating current of 3 amps; room temperature of the bath; and plating time of 5 minutes. The tin electrodeposit on the Hull test panel exhibited good brightness over the current density range of 10–40 a.s.f.

TEST RUN NO. 9

2 ml. of the isopropanol solution of Schiff base-terminated, substantially linear, low copolymer of acrolein and crotonaldehyde prepared in accordance with Test Run No. 3, Part A herein, was added to an aqueous fluoborate acid tin electroplating bath of a substantially identical composition as that set forth in Test Run No. 8 herein. 0.5 ml. of an ethoxylated nonyl phenol surfactant was also added to the fluoborate acid tin bath. Tin plating was carried out in a Hull test cell under substantially identical conditions of operating current amperage, bath temperature and plating time as employed in Test Run No. 8, Part B herein. The tin electro-deposit on the Hull test panel showed good brightness over the current density range of 10–40 a.s.f.

In additional tests carried out utilizing a Hull test cell and a stannous sulfate-containing acid tin electroplating bath of a composition similar to that set forth in Test Run No. 1, Part B herein addition to the bath of a copolymer of acrolein and vinyl acetate copolymerized in a mole ratio of 4:1 respectively resulted in a tin electrodeposit of fair brightness on the test panel. The copolymer of the test immediately supra was Schiff base-terminated by addition of o-toluidine to the reaction mixture, and a non-ionic surfactant was also added to the plating bath in the test.

Acrolein per se added separately to a stannous sulfate-containing acid tin electroplating bath of composition substantially identical to that set forth in Test Run No. 1, Part B herein resulted in a non-bright tin electrodeposit on the Hull test panel over the entire current density range of the panel. Moreover, its strong lachrymatory property as well as the toxic and irritating nature of the acrolein made it difficult to work with.

The bright tin electrodepositing of the present invention has utility for electrical contacts, electronic component, hardware, and jewelry. The deposits are ductile and submit to soldering operations.

What is claimed is:

1. An additive solution for a bright tin electroplating bath comprising a mixture of a substantially linear, soluble Schiff base-terminated reaction product of an α-, β-ethylenically unsaturated aldehyde of the formula

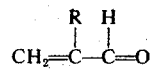

wherein R is hydrogen or methyl, and a water-miscible solvent therefor, the reaction product of the aldehyde having a molecular weight in the range of about 300–900 and being present in the additive solution in amount in the range of about 5%–95% by weight based on total additive solution, said reaction product being prepared by reacting the ethylenically unsaturated aldehyde in an aqueous solution of an alkaline material selected from the group consisting of an alkali metal carbonate, sodium hydroxide, potassium hydroxide and triethylamine in the presence of a primary amine as a Schiff base terminal group precursor selected from the group consisting of aromatic primary amines, heterocyclic primary amines and benzyl amine.

2. The additive solution of claim 1 wherein the solvent is a water-miscible organic liquid solvent.

3. The additive solution of claim 2 wherein the solvent is a 1-3C alkyl alcohol.

4. The additive solution of claim 3 wherein the alcohol is isopropanol.

5. The additive solution of claim 1 wherein the mole ratio of the primary amine precursor of the Schiff base terminal group to α-, β-ethylenically unsaturated aldehyde polymerizable reactant provided in the reaction mixture is in the molar ratio range of from about 1:2.5 to about 1:7.5 respectively.

6. The additive solution of claim 32 wherein the Schiff base terminal group of the reaction product has the formula

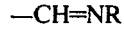

wherein R is an aryl group.

7. The additive solution of claim 6 wherein the Schiff base terminal group is of the formula

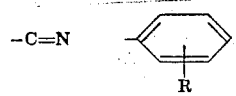

wherein R is —CH$_3$ or —H.

8. The additive solution of claim 1 wherein the selected alkaline material is an alkali metal carbonate.

9. The solution of claim 8 wherein the alkali metal carbonate is potassium carbonate.

10. The solution of claim 8 wherein the alkali metal carbonate is sodium carbonate.

11. The additive solution of claim 1 wherein the ethylenically unsaturated aldehyde is acrolein.

12. The additive solution of claim 1 wherein the ethylenically unsaturated aldehyde is methacrolein.

13. The additive solution of claim 1 wherein the ethylenically unsaturated aldehyde is acrolein and a different copolymerizable compound selected from the group consisting of methacrolein, crotonaldehyde, formaldehyde, acrylamide and vinyl acetate is also present in the aqueous solution reaction mixture.

14. The additive solution of claim 1 wherein the ethylenically unsaturated aldehyde is methacrolein and a different copolymerizable compound selected from the group consisting of acrolein, crotonaldehyde, formaldehyde, acrylamide and vinyl acetate is also present in the aqueous solution reaction mixture.

* * * * *